US005609370A

United States Patent [19]
Szabo et al.

[11] Patent Number: 5,609,370
[45] Date of Patent: Mar. 11, 1997

[54] POSITIVE LATCH QUICK CONNECTOR

[75] Inventors: George Szabo, Ortonville; Tom E. Grooters, Rochester Hills; Craig Cheney, Lapeer, all of Mich.

[73] Assignee: ITT Corporation, New York, N.Y.

[21] Appl. No.: 349,075

[22] Filed: Dec. 2, 1994

[51] Int. Cl.⁶ ........................................... F16L 39/00
[52] U.S. Cl. .......................... 285/319; 285/921; 285/351
[58] Field of Search .................................. 285/319, 351, 285/421, 305, 423

[56] References Cited

U.S. PATENT DOCUMENTS

| | | |
|---|---|---|
| 2,021,241 | 11/1935 | Mall . |
| 3,245,703 | 4/1966 | Manly ........................ 285/319 |
| 3,933,378 | 1/1976 | Sandford et al. .................... 285/319 |
| 4,423,892 | 1/1984 | Bartholomew . |
| 4,487,437 | 12/1984 | Dickirson ........................ 285/319 |
| 4,524,995 | 6/1985 | Bartholomew . |
| 4,526,411 | 7/1985 | Bartholomew . |
| 4,541,658 | 9/1985 | Bartholomew . |
| 4,730,856 | 3/1988 | Washizu ........................ 285/319 |
| 4,778,203 | 10/1988 | Bartholomew .................... 285/319 |
| 4,869,534 | 9/1989 | Ketcham et al. . |
| 4,923,220 | 5/1990 | Guest et al. . |
| 4,925,217 | 5/1990 | Ketcham . |
| 4,936,544 | 6/1990 | Bartholomew . |
| 4,946,205 | 8/1990 | Washizu . |
| 4,948,175 | 8/1990 | Bartholomew . |
| 4,964,658 | 10/1990 | Usui et al. ...................... 285/319 |
| 4,991,882 | 2/1991 | Gähwiler ........................ 285/319 |
| 5,005,878 | 4/1991 | Smith ............................ 285/319 |
| 5,048,875 | 9/1991 | Usui et al. . |
| 5,090,748 | 2/1992 | Usui et al. ...................... 285/319 |
| 5,114,250 | 5/1992 | Usui ............................. 285/319 |
| 5,127,682 | 7/1992 | Washizu ......................... 285/319 |
| 5,152,555 | 10/1992 | Szabo . |
| 5,161,830 | 11/1992 | Abe ............................. 285/319 |
| 5,178,424 | 1/1993 | Klinger . |
| 5,195,787 | 3/1993 | Bartholomew . |
| 5,219,188 | 6/1993 | Abe et al. . |
| 5,267,757 | 12/1993 | Dal Palù ........................ 285/319 |
| 5,275,443 | 1/1994 | Klinger . |
| 5,297,818 | 3/1994 | Klinger . |
| 5,328,216 | 7/1994 | Miyauchi et al. ................. 285/319 |
| 5,374,084 | 12/1994 | Potokar ......................... 285/319 |

FOREIGN PATENT DOCUMENTS 9532382  11/1995  WIPO .

*Primary Examiner*—Eric K. Nicholson
*Attorney, Agent, or Firm*—Thomas N. Thomey; J. Gordon Lewis

[57] ABSTRACT

A quick connector includes a retainer for detachably engaging male and female components of the quick connector together. The retainer includes an annular base with a recess mountable over a radially enlarged flange on the male component and circumferentially spaced legs extending axially from the base. An aperture in each leg engages a projection on the female component to interconnect the male and female components together. First and second seal members, each having the same inner diameter, but different outer diameters are pre-mounted on the male component and simultaneously engage different diameter portions of a stepped bore in the female component upon insertion of the male component into the female component. In another embodiment, the seal members are mounted in the bore in the female component prior to insertion of the male component, with the male component having a reduced diameter end portion simultaneously engagable with one seal member with engagement of an adjacent enlarged diameter portion of the male component with another seal member. One or more bushings are mounted on the male component surrounding the seal members. Alternately, the bushings are integrally formed as a unitary one-piece part of the male component.

41 Claims, 3 Drawing Sheets

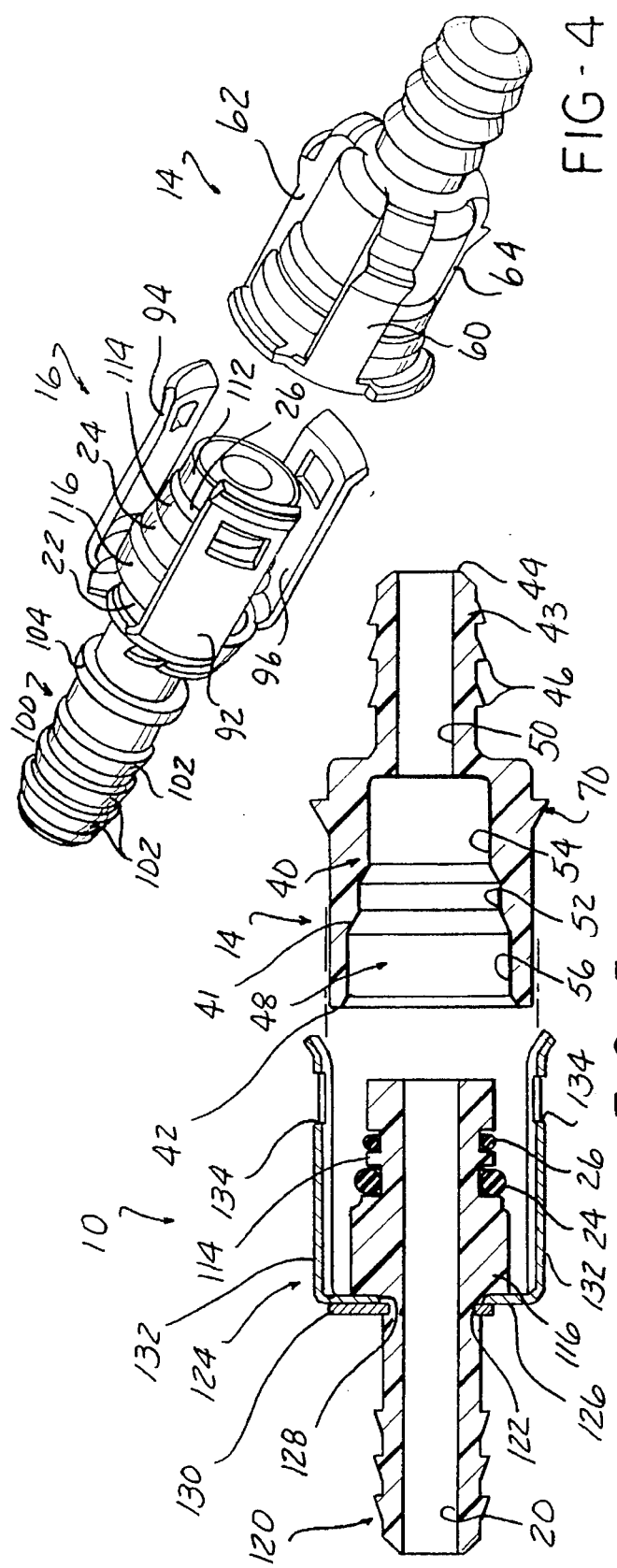
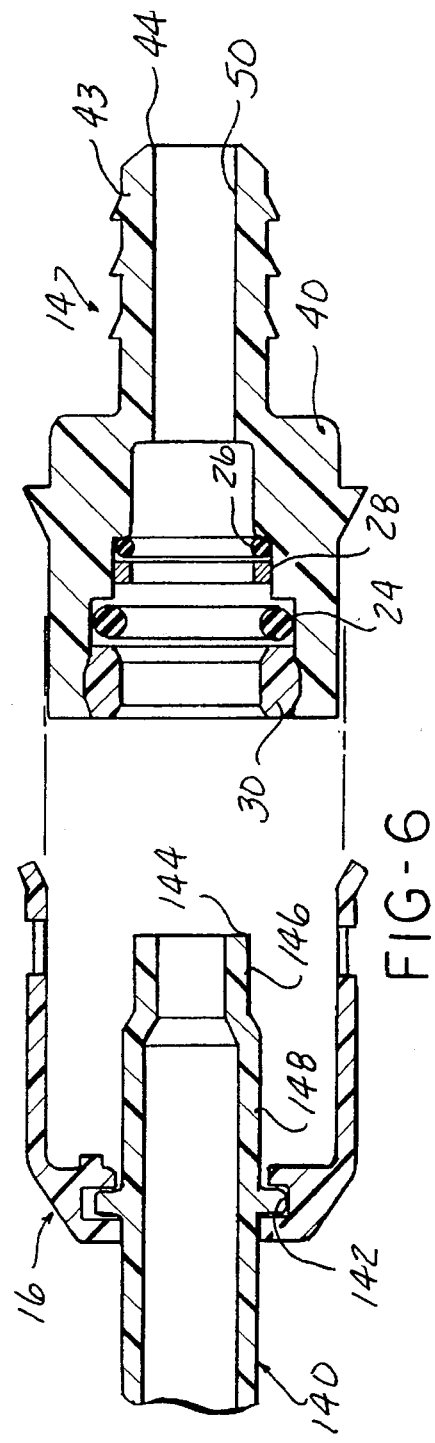

POSITIVE LATCH QUICK CONNECTOR

BACKGROUND OF THE INVENTION

1. Field of the Invention

The present invention relates, in general, to quick connectors and, more specifically, to quick connectors including a removably insertable retainer for coupling the male and female components of the quick connector together.

2. Description of the Art

Snap-fit or quick connectors are employed in a wide range of applications, particularly, for joining fluid carrying conduits in automotive and industrial applications. In a typical quick connector, a retainer is fixedly mounted within a bore in a housing of a female connector component or element. The retainer has a plurality of radially extending legs which extend inwardly toward the axial center line of the bore in the housing. A male component, such as a tube or fitting, to be sealingly mounted in the bore in the female component includes a radially upset portion or flange which abuts an inner peripheral surface of the retainer legs. Seal and spacer members as well as a bearing and a top hat are typically mounted sequentially in the bore ahead of the retainer to form a seal between the housing and the male fitting when the male fitting is lockingly engaged with the legs of the retainer.

While such a retainer is usually effective in releasably coupling the male and female components of a quick connector, it is possible that the male fitting may be partially, but not be fully seated or coupled to the internal seal elements in the bore of the female component and not fully locked in position by the retainer legs. In this partially engaged position, the male fitting may work itself free of the housing thereby causing leaks in the fluid delivery system.

It is an essential object of every quick connector to ensure that the male and female components are fully coupled together to prevent leaks. In order to attain this object, retainers have been designed for quick connectors which ensure a positive sealing engagement between the male and female components of the quick connector and/or which provide a visible indication that such a full sealing has been effected. However, in order to meet this essential object, the retainers have become complex in design and cost and/or the use of an additional component, such as an indicator clip, has been required to provide the desired visible indication of full sealing between the male and female components of the quick connector.

In constructing a typical quick connector, the various seal and spacer members, which include two spaced, elastomeric O-rings, an intermediate spacer disposed between the two O-rings, an endmost bushing and an opposed endmost bushing or top hat, are mounted in a stepped portion of the bore in the housing of the female component. This has required the use of a mounting tool, such as a so-called "stuffer pin", as shown in U.S. Pat. No. 5,195,787. The various seal and spacer members are mounted on the stuffer pin in the desired sequential, axial order before the stuffer pin is inserted into the bore in the housing of the female component. After the endmost bushing or top hat snaps into an undercut or notch in the housing, the stuffer pin is removed. In such an arrangement, the various O-rings, spacers and bushings typically have the same inner diameter such that during insertion of the male component or fitting into the bore in the housing, the end portion of the male component sequentially contacts the top hat, the first O-ring, the spacer, the second O-ring and then the opposed endmost bushing. Each top hat, bushing, spacer and, in particular, the O-rings present a certain amount of resistance to insertion of the male component which creates sequential increasing peaks in insertion force necessary to fully insert and seat the male component within the bore of the housing of the female component. This sequential, increasing resistance to insertion is felt by the installer and may cause a false indication of full seating of the male component within the female component due to the magnitude of such resistance to insertion.

Further, in a typical quick connector, it is common due to manufacturing tolerances for the male component to exhibit a certain amount of axial movement within the bore of the housing of the female component, even when the male component is completely locked within the bore by the retainer. In certain applications, such as vehicle air conditioning connections, such axial movement could lead to a leak.

Thus, it would be desirable to provide a quick connector for use in fluid connections which provides a positive latch of the male component to the female component of the quick connector. It would also be desirable to provide a quick connector in which the resistance to insertion of the male component into the female component is exhibited at a single insertion force peak. It would also be desirable to provide a quick connector which minimizes axial movement of the male component within the female component when the male component is fully locked to the female component by the retainer. It would also be desirable to provide a quick connector in which the various seal and spacer components may be easily mounted in the bore of the female component without the use of a separate insertion tool.

SUMMARY OF THE INVENTION

The present invention is a positive latch quick connector which includes a retainer for detachably coupling the male and female components of a quick connector in fully seated, leak-free engagement.

According to one embodiment of the present invention, the quick connector includes a female component having a through bore with a stepped first end portion opening to a first end of the female component and a second generally constant diameter end portion communicating with a second end of the female component. A male component has a through bore and a radially enlarged annular flange spaced from one end which is insertable through the first end of the female component into the through bore in the female component. Projection means are formed on one of the female and male components. Means are provided on the other of the female and male components for releasably engaging the projection means when the male component is fully inserted into the bore in the female component. A retainer means is demountably coupled to the male component and cooperates with the projection means and the means for releasably engaging the projection means for interconnecting the female and male components together.

In one embodiment, the projection means is mounted or formed on the female component and extends radially outward and is spaced from one end of the female component. The means for releasably engaging the projection means includes the retainer means having a base with an aperture for receiving the male component therethrough and at least one leg extending from the base and adapted to overlie an exterior surface of the female component when the retainer means is mounted on the male component and the male component is inserted into the female component. An aperture is formed in the at least one leg for releasibly engaging the projection means on the female component to releasibly interconnect the male and female components. Preferably, the retainer means is formed with a plurality of circumferentially spaced legs extending from the base. An aperture is formed in each of the plurality of legs and engages the projection means on the female component, which projection means may be in the form of a plurality of like circumferentially spaced projections or a single annular projection extending circumferentially about the female component.

Means are also provided for detachably mounting the retainer means on the male component. In a preferred embodiment, the detachably mounting means comprises the retainer means having a recess formed in the base which opens to the aperture in the base and is engagable with the radially extending flange formed on the male component. In addition, a slot means is formed in and extends through one portion of the base to enable the base to be urged over the male component in a snap-on fit.

The stepped portion of the bore in the female component includes a first diameter portion adjacent the first end of the housing and a second smaller diameter portion axially adjacent to the first diameter portion. A first seal member is provided with a first inner diameter sized to engage the male component and a first outer diameter sized to sealingly engage the first diameter portion of the stepped portion of the bore in the housing. A second seal member is provided with a second inner diameter sized to engage the male component and a second outer diameter sized to sealingly engage the second diameter portion of the bore in the housing of the female component. Preferably, the first and second inner diameters of the first and second seal members, respectively, are substantially equal even though the first outer diameter of the first seal member is larger than the second outer diameter of the second seal member. In this embodiment, the axial spacing between the first and second diameter portions of the stepped portion of the bore in the housing of the female component is substantially equal to the axial spacing between the first and second seal members which are preferably premounted on the male component prior to insertion of the male component into the housing such that the first and second seal members respectively engage the first and second diameter portions of the stepped bore in the housing substantially simultaneously during insertion of the male component into the female component. Further, the spacing or dimension between the projection means and the one end of the housing of the female component and the dimension or spacing between the apertures in the leg or legs of the retainer and the base of the retainer are selected such that the apertures in the leg or legs of the retainer engage the projection means on the housing at the same time or after the first and second seal members engage the first and second diameter portions of the stepped bore in the housing of the female component.

In one embodiment, the first and second seal members comprise elastomeric members, such as O-rings. An additional spacer and one or more bushings, such as an endmost top hat and an opposed endmost bushing, are sequentially mounted with the O-rings on the exterior surface of the male component or fitting. This eliminates the need for a separate seal and spacer mounting tool, such as a so-called "stuffer pin", since the seal members, spacer and bushings or top hat may be pre-mounted on the male component prior to insertion of the male component into the female component.

In an alternate embodiment, an annular recess or recesses are formed in the exterior surface of the male component for receiving the first and second seal members. In this embodiment, the spacer and the bushing or top hat are simply mounted on the exterior surface of the male component in spaced relationship to the O-rings mounted in the recess or recesses. In an alternate embodiment, any and preferably all of the top hat, spacer and end bushing are integrally formed as a unitary, one-piece part of the male element, such as by machining the top hat, spacer and bushing in the exterior surface of the male component or by molding such elements with the remainder of the male component during the formation of the male component.

In an alternate embodiment, the radially enlarged flange on the male component is replaced by an annular groove which is positioned immediately adjacent the outside of the retainer at the first end of the housing of the female component when the male component is fully coupled in sealing engagement with the female component. The annular groove receives a suitable lock member, such as a C-ring.

In another embodiment, the male component is formed with a stepped-down or reduced diameter first end. In this embodiment, the seal, spacer and bushing elements are pre-mounted in the stepped portion of the bore of the female component. The reduced diameter end portion of the male component has an outer diameter sized to sealingly engage one of the seal members substantially simultaneously when the adjacent enlarged diameter portion of the male component engages the other seal member to provide a single peak in the insertion force required to fully seat the male component in the female component.

The present invention also comprises a method for connecting the male and female components of a quick connector together. The method comprises the steps of:

forming a female component of a housing having a through bore extending from a first open end to an opposed second open end;

forming a male component with a radially enlarged flange spaced from a first end;

forming a retainer with a base having a central aperture for receiving the male component therethrough and at least one leg extending from the base;

forming a projection extending from one of the housing of the female component and the leg of the retainer;

forming a projection receiving aperture in the other of the housing and the leg;

forming a recess in the base of the retainer for engaging the radially extending flange on the male component to mount the retainer on the male component, with the leg of the retainer extending axially from the base;

detachably mounting the retainer on the male component with the recess in the retainer engaged with the flange on the male component; and inserting one end of the male component through the first open end of the housing of the female component into the bore in the housing until the projection and the aperture engage to lock the male and female components together.

Preferably, the method includes the step of forming a plurality of circumferentially spaced legs on the retainer, each leg having an aperture formed adjacent one end, and the step of forming the projection on the housing of the female component to be engagable with the apertures in the plurality of legs. The projection may be in the form of a plurality of circumferentially spaced projections formed on the housing of the female component, each projection engagable with one aperture in one leg of the retainer, or a continuous annular projection.

The method also includes the step of forming an axial slot in the base of the retainer, and the step of urging the base over the male component such that opposed edges of the base forming the slot deflect outward from each other and then snap over the male component.

The method of the present invention further comprises the steps of:

forming a first diameter portion in the bore of the housing;

forming a second diameter portion in the bore of the housing smaller in diameter than the first diameter portion and axially spaced from the first diameter portion;

spacedly mounting first and second seal members on the male component prior to insertion of the male component into the female component;

forming the first and second seal members with substantially identical inner diameters;

forming a first outer diameter of the first seal member to sealingly engage the first diameter portion of the bore in the housing;

forming a second outer diameter of the second seal member to sealingly engage the second diameter portion of the bore in the housing; and axially disposing the first and second diameter portions of the bore in the housing such that the first and second seal members sealingly engage the first and second diameter portions of the bore substantially simultaneously upon insertion of the male component into the female component.

This last described method further includes the steps of:

forming an aperture in a leg of the retainer;

forming a radially outwardly extending projection on the housing of the female component; and disposing the aperture in the leg at a distance from the base of the retainer and forming the projection in the housing at a distance from one end of the housing such that the aperture engages the projection not earlier than engagement of the first and second seal members with the first and second diameter portions, respectively, in the bore of the female component housing.

In another embodiment, the method of the present invention includes the steps of forming at least one annular recess on the male component, mounting the first and second seal members in the recess, with the first outer diameter of the first seal member extending radially outward further than the second outer diameter of the second seal member.

The method also comprises the steps of mounting first and second bushings on the male component, with the first bushing mounted between the radial flange and the first seal member mounted on the male component and the second bushing mounted between the first end of the male component and the second seal member. Preferably, the first and second bushings are integrally formed as a unitary, single piece part of the male component.

In another embodiment, the method of the present invention includes forming the first end of the male component with a reduced diameter end portion and an enlarged diameter end portion extending from the reduced diameter first end. The first and second seal members are respectively mounted in first and second diameter portions of the stepped bore in the housing of the female element, with the first seal member sealingly engaging the enlarged diameter portion of the male component substantially simultaneously with engagement of the second seal member with the reduced diameter first end portion of the male component.

The positive latch quick connector and method of connecting the male and female components of a quick connector according to the present invention provides significant advantages over previously devised quick connectors. The positive latch quick connector provides minimal axial movement of the male component relative to the female component when the male component is fully engaged with the female component. This makes the quick connector ideal for certain applications, such as vehicle air conditioning systems. This limited axial movement is achieved by the dimensional relationship between the spacing between the apertures on the legs of the retainer and the base of the retainer and the axial spacing between the projection or projections on the female component housing and the first open end of the housing, as well as the pre-mounting of the retainer on the radially enlarged flange of the male component.

The unique stepped bore formed in the housing of the female component with first and second different diameter stepped bore portions coupled with the use of first and second seal members having the same inner diameter, but different outer diameters which are sized to respectively sealingly engage the first and second diameter portions of the stepped bore in the housing provides a single peak insertion force since the first and second seal members engage the first and second diameter portions in the bore of the female component housing substantially simultaneously during insertion of the male component into the female component. Since only a single peak insertion force is encountered during insertion of the male component into the female component, false indications of full engagement of the male component in the female component are minimized. Finally, the unique pre-mounting of the seal and spacer members on the male component prior to insertion of the male component into the female component eliminates the need for a separate mounting tool previously required in quick connectors to premount the seal and spacer members in the bore of the female component housing.

BRIEF DESCRIPTION OF THE DRAWING

The various features, advantages and other uses of the present invention will become more apparent by referring to the following detailed description and drawing in which:

FIG. 4 is an exploded, perspective view of the quick connector shown in FIG. 3, with the retainer premounted on the male component;

FIG. 5 is an exploded, longitudinal cross sectional view of another embodiment of the quick connector of the present invention; and FIG. 6 is an exploded, longitudinal cross sectional view of yet another embodiment of the quick connector of the present invention.

DESCRIPTION OF THE PREFERRED EMBODIMENTS

Figure 1:
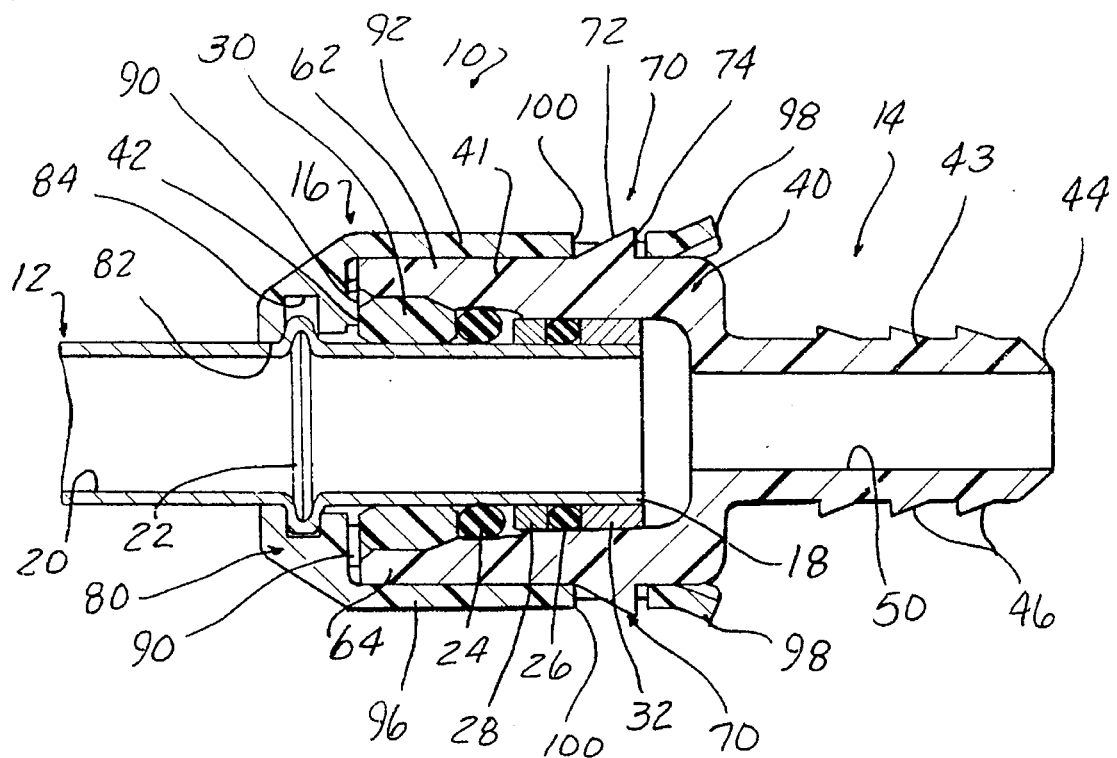
FIG. 1 is a longitudinal cross sectional view of an assembled quick connector according to one embodiment of the present invention, with one leg of the retainer and one rib on the female component shown out of position.

Referring now to the drawing, and in to particular to FIGS. 1–6, there is depicted various embodiments of a quick connector for connecting fluid conduits or elements in a fluid delivery system, such as a fluid delivery system found in vehicle fuel systems, vehicle cooling systems and vehicle air conditioning systems.

Figure 2:
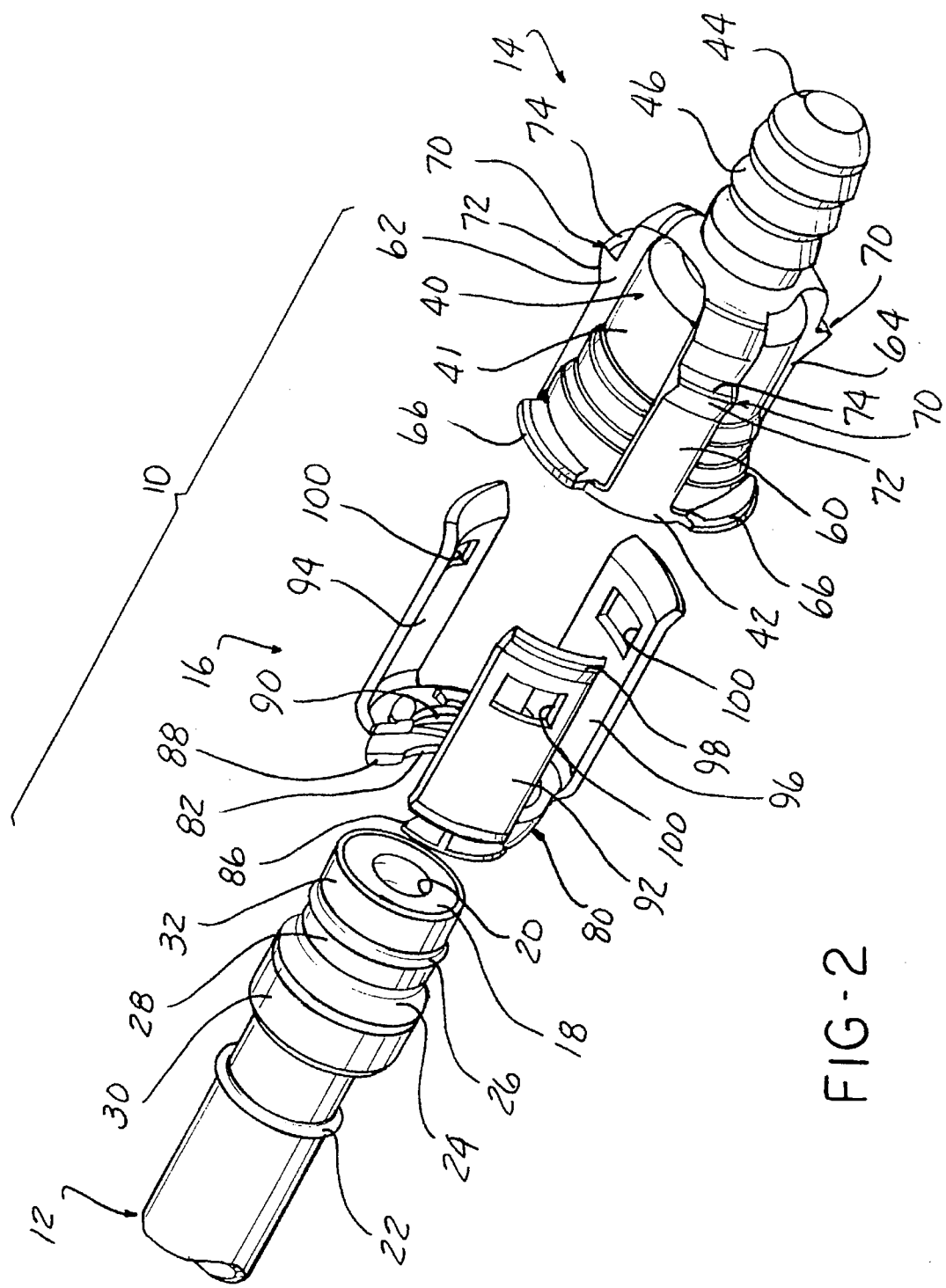
FIG. 2 is an exploded, perspective view of the components of the quick connector shown in FIG. 1 depicted in a preassembled position.

FIGS. 1 and 2 depict a first embodiment of a quick connector 10 of the present invention. The major components of the quick connector 10 include a male component 12, such as a tubular conduit or fitting, a female conduit 14, and a retainer means denoted generally by reference number 16. The male component 12, hereafter referred to as a fitting, is in the form of a tubular member having a first end 18, a longitudinally extending through bore 20 and an outwardly, radially extending, annular flange 22 which is spaced from the first end 18. The first end portion of the fitting 12 extending from the first end 18 to the annular flange 22 has a smooth, cylindrical exterior surface. The opposed end of the fitting 12 extending from the flange 22 oppositely from the first end 18 is depicted as having a smooth, cylindrical exterior; but may be provided with one or more radially extending, annular barbs or projections for sealingly engaging a flexible conduit, not shown.

In the embodiment shown in FIGS. 1 and 2, various seal members, spacers and bushings typically employed in quick connectors are pre-mounted on the first end portion of the fitting 12. By way of example only, a first seal member 24 and a second seal member 26 are mounted in a spaced apart position on the first end portion of the fitting 12. The first and second seal members 24 and 26, respectively, are preferably annular, ring-like members formed of an elastomeric material. Preferably, the first and second seal members 24 and 26 comprise elastomeric O-rings. The first seal member 24 is provided with a first inner diameter sized to snugly engage the exterior surface of the first end portion of the fitting 12 and a first outer diameter sized to sealingly engage a portion of a stepped bore formed in the female component 14, as described hereafter. The second seal member 26 has a second inner diameter also sized to snugly engage the exterior surface of the first end portion of the fitting 12 and a second outer diameter sized to sealingly engage a different portion of the stepped bore in the female component 14, as also described hereafter. The first and second inner diameters of the first and second seal members 24 and 26, respectively, are substantially identical. However, the first outer diameter of the first seal member 24 is greater than the second outer diameter of the second seal member 26, for reasons which will become more apparent hereafter.

As is conventional, a spacer 28 is disposed between the first and second seal members 24 and 26, preferably, in a press-on fit to the first end portion of the fitting 12. A first bushing 30, such as a so-called "top hat", is pressed or slip fit mounted about the first end portion of the fitting 12 immediately adjacent the first seal member 24 as shown in FIGS. 1 and 2. The first bushing or top hat 30 is disposed between the first seal member 24 and the annular flange 22 on the fitting 12. A second bushing 32 is slip fit mounted on the first end portion of the fitting 12 between the first end 18 of the fitting 12 and the second seal member 26.

It should be noted that the fitting 12 may be formed of any material suitable for use in fluid delivery systems, such as a suitable metal or plastic.

The female component 14 is in the form of a housing 40 formed of a suitable material, such as a metal or, preferably, a plastic, such as nylon for example only. The housing 40 has a generally tubular shape including a first end portion 44 extending from a first end 42 and a reduced diameter second end portion 45 extending from the first end portion to a second end 44. The second end portion 43 may include one or more exterior annular ridges or barbs 46 to securely engage one end of a flexible conduit, not shown, mounted thereover.

As shown in greater detail in FIG. 5, a through bore is formed in and extends through the housing 40 between an open end at the first end 42 and an open end at the opposed second end 44. The through bore is preferably formed with a first stepped bore portion 48 which extends from the first end 42 and a generally constant diameter second bore portion 50 extending from the first stepped bore 48 through the second end portion 43 to the open second end 44 of the housing 40. The stepped bore portion 48 is preferably formed with a plurality of different diameter portions including a first diameter portion 52, a second diameter portion 54 which extends axially from the first diameter portion 52, and a third diameter portion 56 which extends from an opposite end of the first diameter portion 52 to the open first end 42. Preferably, the first diameter portion 52 has a greater diameter than the second diameter portion 54. By example only, the third diameter portion 56 has a greater diameter than the first diameter portion 52.

The first diameter portion 52 of the stepped bore portion 48 has a diameter which is sized to be sealingly engaged by the outer diameter of the first seal member or O-ring 24 when the male component 12 is inserted into the female component 14. Similarly, the second seal member 26 has an outer diameter sized to sealingly engage the second diameter portion 54 of the stepped bore portion 48 in the housing 40. Preferably, the outer diameter of the second seal member 26 is smaller than the diameter of the first bore portion 52 to enable the second seal member 26 to pass freely through the first diameter bore portion 52, without substantial contact with the wall forming the first diameter bore portion 52 during insertion of the male component 12 into the female component 14. The purpose of this dimensional relationship will become more apparent in the following description.

The spacer 28 is also formed with an outer diameter sized to be disposed in close contact with the second diameter portion 54 of the stepped bore 48. The enlarged third diameter bore portion 56 is sized and shaped by means of angled edge walls to fixedly receive the first bushing or top hat 30.

Although the exterior surface of the body 40 of the female component 14 may have a solid, smooth-walled configuration, for weight reduction purposes it is preferred that the outer surface of the housing 40 be formed with a plurality of longitudinally extending solid ribs 60, 62 and 64 which extend longitudinally from the first end 42 of the housing 40 to the beginning end of the second end portion 43. Stepped surfaces are formed between the ribs 60, 62 and 64 in a shape complimentary to the shape of the stepped bore 48 portion within the housing 40.

It will be understood that the description and illustration of three ribs 60, 62 and 64 is by way of example only as the number of such ribs may be selected consistent with the number of legs on the retainer 16, as described hereafter, and a different number and circumferential spacing of the ribs is also possible.

Further, radially enlarged, generally arcuate collars, each denoted by reference number 66, are formed at the first end 42 of the housing 40 and each extend circumferentially between one end of the circumferentially spaced ribs 60, 62 and 64 as shown in FIG. 2.

According to the present invention, a projection means 70 is formed on one of the fitting 12 or the female component 14. By way of example only, the projection means 70 shown in FIGS. 1 and 2 is depicted as being formed on the female component 14, as an integral part of each rib 60, 62 and 64. Each projection means 70 is in the form of a projection having a ramp surface 72 extending angularly outward from the plane of the respective rib 60, 62 or 64 and a flat end wall 74 extending from an outer edge of the ramp surface 72 to the respective rib 60, 62 or 64. Each of the projection means 70 is disposed at a selected dimensional spacing from the first end 42 of the housing 40 for reasons which become more apparent hereafter.

It will also be understood that the projection means 70 may take the form of a continuous annular ring having a ramp surface 72 and a flat end wall 74 extending completely circumferentially about the housing 40. In this instance, the exterior surface of the housing 40 would preferably have a generally smooth, cylindrical shape.

The retainer means 16 is preferably in the form of an integral, one-piece body formed of a suitable metal or plastic, such as nylon. The retainer 16, as shown in FIGS. 1, 2 and 4, is formed with a base portion 80 which has a central aperture 82 sized to receive the male component or fitting 12 therethrough. An annular recess 84 is formed in one portion of the base 80 and opens to the central aperture 82. The recess 84 is sized to engage the annular flange 22 on the fitting 12 to securely, yet rotatably mount the retainer 16 on the fitting 12.

A slot formed by an annular discontinuity in the base 80 is formed by two spaced, opposed edge walls 86 and 88 as shown in FIG. 2. The slot enables the base 80 of the retainer 16 to be slidingly urged over the fitting 12 to mount the retainer 16 on the fitting 12. During such mounting, the side walls 86 and 88 are deflected outward from each other to enable the side walls 86 and 88 to expand over the diameter of the fitting 12 and then back into their normal spacing to mount the retainer 16 on the fitting 12. Pads 90, as shown in FIGS. 1 and 2, are formed on an inner face of the base 80 and engage the first end 42 of the housing 40 of the female component 14 after the retainer 16 and the fitting 12 have been urged over and into the female component 14 as described in greater detail hereafter.

A projection receiving means is formed on one of the retainer 16 or the female component 14. In the exemplary embodiment shown in FIGS. 1 and 2, the projection receiving means is formed on the retainer 16 to engage the projections 70 formed on the female component 14. It will be understood that an opposite construction in which the projection receiving means is formed on the female component 14 and the projections 70 are formed on the retainer 16 is also possible according to the present invention.

The projection receiving means preferably includes at least one and preferably a plurality of circumferentially spaced planar legs, with three legs 92, 94 and 96 being shown by way of example only. The number of legs 92, 94 and 96 is selected in this embodiment to correspond to the number of ribs 60, 62 and 64 formed on the female component 14. Although only one leg may be employed on the retainer 16, it is preferred that two, three, four or even more legs be used to securely attach the retainer 16 to the female component 14. As each of the legs 92, 94 and 96 is identically constructed, the following description of leg 92 will be understood to apply equally to legs 94 and 96.

The leg 92 extends longitudinally from the base 80 generally parallel to the longitudinal axis of the fitting 12 on which the retainer 16 is mounted. The leg 92 terminates in an outer end 98 which preferably has an outwardly angled shape to act as a cam surface to aid in deflecting the leg 92 over the ramp surface 72 on the projection 70 when the male fitting 12 and the retainer 16 are urged into engagement with the female component 14. The projection receiving means is preferably in the form of an aperture 100 of any suitable shape, such as square, rectangular, circular, etc., which is formed in the leg 92 spaced from the outer end 98. The aperture 100 is sized to receive the projection 70 on the housing 40 as shown in FIG. 1 to securely connect the retainer 16 and, due to the mounting of the retainer 16 to the fitting 12, to connect the fitting 12 to the housing 40 of the female component 14.

In use, the top hat 30, the first seal or O-ring 24, the spacer 28, the second seal member or O-ring 26, and the end bushing 32 are sequentially mounted to the fitting 12. Next, the retainer 16 is mounted on the fitting 12 by snapping the base 80 over the annular flange 22 on the fitting 12 to bring the annular recess 84 in the base 80 of the retainer 16 into engagement about the annular flange 22 on the fitting 12 as shown in FIGS. 1 and 4. In this pre-insertion position, the legs 92, 94 and 96 extend axially in parallel to, but are spaced from the cylindrical first end portion of the fitting 12.

The combined fitting 12 and retainer 16 is then urged into engagement with the female component 14 by first aligning the legs 92, 94 and 96 on the retainer 16 with the ribs 60, 62 and 64 on the female component 14. Since the retainer 16 is capable of rotational movement about the annular flange 22 on the fitting 12, such angular orientation of the retainer 16 to bring the legs 92, 94 and 96 into alignment with the ribs 60, 62 and 64 on the male component 14 is easily accomplished.

The legs 92, 94 and 96 are urged over and along the respective ribs 60, 62 and 64 on the female component 14 as the first end 18 of the fitting 12 is inserted through the open first end 42 of the housing 40 into the stepped bore 48 within the housing 40. During such insertion, the second seal member or O-ring 26 freely slides through the first diameter bore portion 52 and the enlarged third diameter bore portion 56 in the stepped bore 48 until it reaches the correspondingly sized second diameter bore portion 54. Simultaneously, the first seal member or O-ring 24 sealingly engages the correspondingly sized first diameter bore portion 52. Further, at this time the top hat 30 engages its correspondingly formed third diameter bore portion 56 in the housing 40 to sealingly connect the fitting 12 to the female component 14. Since the first and second seal members 24 and 26 engage the respective first and second diameter portions 52 and 54 in the stepped bore 48 at substantially the same instance, the installer receives only a single tactile resistance to insertion which must be overcome to fully seat the male fitting 12 in the female component 14. This prevents any false sealing feedback which is experienced in previously devised quick connectors where resistance is met by engagement of each of the bushings, spacer and seal members with the stepped bore portion of the female component.

At or just after the sealing engagement of the first and second seal members 24 and 26 with the corresponding first and second diameter bore portions 52 and 54, the projections 70 snap into and securely engage the apertures 100 in the legs 92, 94 and 96 to securely lock the retainer 16 and, thereby, the fitting 12 to the housing 40 of the female component 14.

According to the present invention, the projections 70, the projection receiving means or apertures 100, the annular recess 84 in the retainer 16, as well as the first and second diameter bore portions 52 and 54 and the outer diameters of the first and second seal members 24 and 26 are arranged in a selected dimensional relationship to limit axial movement of the fitting 12 within the female component 14 when the retainer 16 locks the fitting 12 to the female component 14. According to this dimensional relationship, the flat end wall 74 of each of the projections 70 is spaced a predetermined distance from the first end 42 of the housing 40, and the projection receiving apertures 100 in the legs 92, 94 and 96 of the retainer 16 are spaced a predetermined distance from the annular recess 84 in the base 80 of the retainer 16 to ensure that when the projections 70 engage the apertures 100 in the retainer 16, the pads 90 on the base 80 of the retainer 16 are in engagement with the first end 42 of the housing 40 and the first and second seal members 24 and 26 are in sealing engagement with the respective first and second diameter bore portions 52 and 54 in the stepped bore 48. This arrangement ensures that the male fitting 12 is fully seated in sealed engagement in the female component 14 and is incapable of significant axial movement.

The fitting 12 can be removed from the female component 14 through the use of radially outward force on the ends 98 of the legs 92, 94 and 96 of the retainer to urge the outer ends 98 of the legs 92, 94 and 96 over the projections 70 which permits axial disengagement of the retainer 16 and the fitting 12 from the female component 14.

Figure 3:
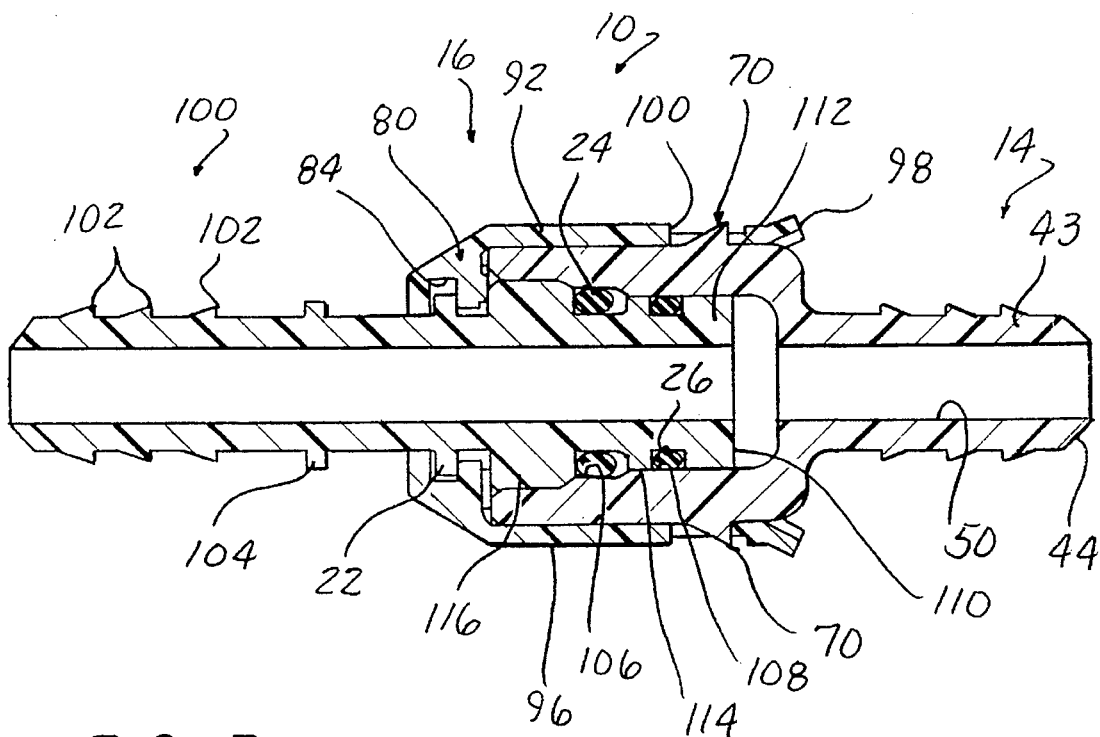
FIG. 3 is a longitudinal cross sectional view of another embodiment of the quick connector of the present invention, with one leg of the retainer and one rib on the female component shown out of position.

Referring now to FIGS. 3 and 4, another embodiment of the quick connector 10 of the present invention is depicted. In this embodiment, the retainer 16 and the female component 14 are identically constructed as in the embodiment shown in FIG. 1 and described above. Further, the male component or fitting 100 is substantially identical to the fitting 12 except for the following differences. As shown in FIGS. 3 and 4, the fitting 100 is provided with a plurality of axially spaced barbs 102 adjacent one end which are designed to securely engage one end of a flexible conduit, not shown, to mount the flexible conduit to the fitting 100. An enlarged annular flange 104 is formed on the exterior surface of the fitting 100 spaced between the barbs 102 and the annular flange 22 to act as a conduit stop.

As shown in FIG. 3, a recess means preferably comprising first and second spaced recesses 106 and 108 are formed in the fitting 12 between one end 110 of the fitting 12 and the annular flange 22. The recesses 106 and 108 have an inner wall disposed at the same diameter with respect to the longitudinal axis of the fitting 100. The first recess 106 is sized to receive the first seal member or O-ring 24, while the second recess 108 is sized to receive the second seal member or O-ring 26.

In this embodiment, the end bushing 112, the intermediate spacer 114 and the opposed end bushing or top hat 116 are integrally formed as a one-piece, unitary part of the fitting 100, such as by machining, or by molding when the fitting 100 is formed of a moldable material, such as a plastic. In this embodiment, assembly of the fitting 100 is simplified since only the O-rings 24 and 26 need be mounted on the male fitting 100 prior to insertion of the male fitting 100 into the female component 14. Otherwise, the operation of the male fitting 100, the retainer 16 and the female component 14 in the embodiment shown in FIGS. 3 and 4 is identical to that described above for the embodiment shown in FIGS. 1 and 2.

FIG. 5 depicts yet another embodiment of the present invention in which the quick connector 10 includes a female component 14 identical to that described above and shown in FIGS. 1–4. The male component or fitting 120 in this embodiment is substantially identical to the fitting 100 described above and shown in FIGS. 3 and 4 except that the fitting 120 lacks the annular flange 22 as well as the conduit stop flange 104 shown in FIG. 3.

In this embodiment, the fitting 120 is provided with an annular groove 122 spaced from an end wall of the integral top hat 116. A retainer 124 is substantially identical to the retainer 16 shown in FIGS. 1–4 except that the base 126 of the retainer 124 is thinner and lacks the internal recess 84. The base 126 of the retainer 124 includes a central aperture 128 through which the fitting 120 extends. The base 126 is designed to abut the end wall of the top hat 116 as shown in FIG. 5. A suitable lock means, such as a C-shaped snap ring 130, is mounted in the groove 122 in the fitting 120 and abuts the base 126 of the retainer 124 to securely mount the retainer 124 on the fitting 120.

The retainer 124 still includes a plurality of legs all denoted by reference number 132 which extend axially from the base 126. Projection receiving apertures 134 are formed in each leg 132 to lockingly engage the projections 170 formed on the female component 14 as described above in the previously described embodiments of the present quick connector.

FIG. 6 depicts yet another embodiment of a quick connector constructed in accordance with the teachings of the present invention. In this embodiment, the quick connector includes a female component 14 and a retainer 16 as described above.

In this embodiment, the male component or fitting 140 is formed with an annular flange 142 spaced from one end 144. A first end portion 146 of the fitting 140 extending from the first end 144 has a first reduced diameter formed by a step or neck on the fitting 140. The step or neck forms an enlarged diameter portion 148 in the fitting 140 extending from the reduced diameter first end portion 146.

The key difference in this embodiment from the other embodiments of the present invention described above is that the first and second seal members or Orings 24 and 26, the spacer 28 disposed between the seal members 24 and 26, and the endmost top hat or bushing 30 are preassembled into the stepped bore of the housing 40 of the female component 14. The top hat 30 fits into an undercut or annular notch formed in the stepped bore in the housing 40 to securely retain the top hat 30 as well as the seal members 24 and 26 and the spacer 28 within the stepped bore of the housing 40.

The first seal member 24 has a larger inner diameter than the inner diameter of the second seal member 26 as shown in FIG. 6. In this manner, the reduced diameter first end portion 146 of the fitting 140 passes freely through the first seal member 24 during insertion of the fitting 140 into the female component 14 until it sealingly engages the second seal member 26. At substantially the same time, that the second seal member 26 engages the reduced diameter end portion 146, the enlarged diameter portion 148 of the fitting 140 sealingly engages the first seal member 24 to provide a single insertion resistance which must be overcome by the installer. Otherwise, the function of the quick connector shown in FIG. 6 is identical to that described above in releasibly coupling a male connector or fitting 140 to a female connector 14 in sealing engagement.

In summary, there has been disclosed a unique quick connector which provides advantages over previously devised quick connectors used in fluid delivery systems. The quick connector of the present invention provides a reduced or limited amount of axial movement of the male component within the female component when the male component is lockingly engaged by the retainer in the female component.

In addition, the seal members are provided with the same inner diameter, but with different outer diameters to enable the male fitting to simultaneously engage correspondingly formed different diameter portions within the stepped bore in the housing of the female component to provide a single resistance to insertion which must be overcome by the installer. This prevents the numerous separate resistance to insertion forces in previously devised connectors wherein the male component successively contacts each seal member, spacer and bushing during its insertion into the female component. Finally, in certain embodiments, the seal, spacer and bushing members used in a quick connector are pre-mounted on the male component along with the retainer prior to the insertion of the male component into the female component. This simplifies connection of the male and female components and eliminates the need for a separate seal, spacer and bushing insertion tool as required in many previously devised quick connectors.

What is claimed is:

1. A quick connector comprising:

a female component having a stepped through bore extending axially from a first open end of the female component to a second end of the female component;

a male component having a through bore and a radially extending annular flange spaced from an end insertable through the first open end of the female component into the stepped through bore in the female component;

at least a first seal engagable with the male component and the stepped bore in the female component;

a retainer carried on the male component;

means on the female component and on the retainer for releasibly interconnecting the male and female components together upon insertion of the male component into the female component;

means, carried on the retainer, for mounting the retainer on the annular flange of the male component; and the first seal, the stepped through bore, the male component, and the releasibly interconnecting means are disposed in a dimensional relationship such that the releasibly interconnecting means interconnects the male and female components substantially simultaneously with engagement of the first seal with both of stepped through bore and the male component.

2. A quick connector comprising:

a female component having a stepped through bore extending axially from a first open end of the female component to a second end of the female component;

a male component having a through bore and a radially extending annular flange spaced from an end insertable through the first open end of the female component into the stepped through bore in the female component;

at least a first seal engagable with the male component and the stepped bore in the female component;

a retainer carried on the male component;

means on the female component and on the retainer for releasibly interconnecting the male and female components together upon insertion of the male component into the female component, the releasibly interconnecting means including;

a projection formed on the female component, the projection extending radially outward from one end of the female component;

the retainer having a base with an aperture for receiving the male component therethrough, and at least one leg extending from the base adapted to overlie an exterior surface of the female component when the retainer is mounted on the male component and the end of the male component is inserted into the female component; and an aperture formed in the at least one leg releasibly engagable with the projection on the female component to releasibly interconnect the male and female components;

means, carried on the retainer, for mounting the retainer on the annular flange of the male component; and the first seal, the stepped through bore, the male component, and the releasibly interconnecting means disposed in a dimensional relationship such that the releasibly interconnecting means interconnects the male and female components substantially simultaneously with engagement of the first seal with both of stepped through bore and the male component.

3. The quick connector of claim 2 wherein:

the at least one leg terminates in an outer end spaced from the base, the outer end extending radially outward from the axial extent of the at least one leg.

4. The quick connector of claim 2 wherein the retainer further comprises:

a plurality of legs circumferentially spaced about and extending from the base, each leg adapted to overlie an exterior surface of the female component when the retainer is mounted on the male component and the end of the male component is inserted into the female component; and an aperture formed in each of the plurality of legs for releasibly engaging the projection on the female component.

5. The quick connector of claim 1 further comprising:

means for detachably mounting the retainer on the male component.

6. The quick connector of claim 5 wherein the detachably mounting means comprises:

the retainer including a base with an aperture receiving the male component therethrough; and a recess formed in the base opening to the aperture in the base and engagable with the annular flange on the male component.

7. The quick connector of claim 6 wherein the releasibly interconnecting means further comprises:

the projection mounted on the female component and extending radially outward from one end of the female component;

the retainer having a base with an aperture for receiving the male component therethrough, and at least one leg extending from the base adapted to overlie an exterior surface of the female component when the retainer is mounted on the male component and the end of the male component is inserted into the female component; and an aperture formed in the at least one leg releasibly engagable with the projection on the female component to releasibly interconnect the male and female components.

8. The quick connector of claim 7 wherein the retainer further comprises:

a plurality of legs circumferentially spaced about and extending from the base, each leg adapted to overlie an exterior surface of the female component when the retainer is mounted on the male component and the end of the male component is inserted into the female component; and an aperture formed in each of the plurality of legs for releasably engaging the projection on the female component.

9. The quick connector of claim 1 wherein the retainer mounting means further comprises:

a base having an aperture receiving the male component therethrough;

a recess formed in the base opening to the aperture in the base and engagable with the annular flange on the male component; and slot means, extending through a portion of the base, for enabling the base to be opened about the slot means and urged over the male component.

10. The quick connector of claim 9 wherein:

the retainer is pre-mounted on the male component prior to insertion of the end of the male component into the female component.

11. The quick connector of claim 1 further comprising:

the stepped first bore portion in the female component including a first diameter portion adjacent the first end of the female component and a second smaller diameter portion adjacent to the first diameter portion.

12. A quick connector comprising:

a female component having a stepped through bore extending axially from a first open end of the female component to a second end of the female component, the stepped through bore in the female component including a first diameter portion adjacent the first end of the female component and a second smaller diameter portion adjacent to the first diameter portion;

a male component having a through bore and a radially extending annular flange spaced from an end insertable through the first open end of the female component into the stepped through bore in the female component;

a first seal member having a first inner diameter sized to engage the male component and a first outer diameter sized to sealingly engage the first diameter portion of the stepped through bore in the female component;

a second seal member having a second inner diameter sized to engage the male component and a second outer diameter sized to sealingly engage the second diameter portion of the stepped through bore in the female component;

a retainer carried on the male component;

means on the female component and on the retainer for releasably interconnecting the male and female components together upon insertion of the male component into the female component;

means carried on the retainer, for mounting the retainer on the annular flange of the male component; and the first and second seal members, the first and second diameter portions of the stepped through bore, the male component, and the releasibly interconnecting means disposed in a dimensional relationship such that the releasibly interconnecting means interconnects the male and female components substantially simultaneously with engagement of the first and second seal members with the first and second diameter portions of the stepped through bore and the male component.

13. The quick connector of claim 12 wherein:

the first and second inner diameters of the first and second seal members, respectively, are substantially equal; and the first outer diameter of the first seal member is greater than the second outer diameter of the second seal member.

14. The quick connector of claim 12 wherein the first and second seal members are elastomeric rings.

15. The quick connector of claim 13 wherein:

the first and second seal members are pre-mounted on the male component prior to insertion of the end of the male component into the female component.

16. The quick connector of claim 15 wherein:

the axial spacing between the first and second diameter portions of the stepped first bore portion of the female component are substantially equal to the axial spacing between the first and second seal members pre-mounted on the male component such that the first and second seal members respectively engage the first and second diameter portions of the stepped first bore portion in the female component substantially simultaneously during insertion of the end of the male component into the female component.

17. The quick connector of claim 15 further comprising:

a spacer disposed between the first and second seal members.

18. The quick connector of claim 15 further comprising:

a first bushing pre-mounted on the male component between the first seal member and the annular flange on the male component; and a second bushing pre-mounted on the male component between the end of the male component and the second seal member.

19. The quick connector of claim 16 further comprising:

recess means formed in the male component for receiving the first and second seal members.

20. The quick connector of claim 19 wherein the recess means comprises:

first and second spaced, annular recesses, each receiving one of the first and second seal members, respectively.

21. The quick connector of claim 16 comprising:

the retainer including a base with an aperture receiving the male component therethrough;

a recess formed in the base opening to the aperture in the base and engagable with the annular flange on the male component;

the projection mounted on the female component and extending radially outward from one end of the female component;

the retainer including a plurality of circumferentially spaced legs extending from the base adapted to overlie an exterior surface of the female component when the retainer is mounted on the male component and the one end of the male component is inserted into the female component; and an aperture formed in each of the plurality of legs releasibly engagable with the projection on the female component to releasibly interconnect the male and female components.

22. The quick connector of claim 21 wherein:

the aperture in each leg is spaced from the annular recess in the retainer by a distance such that the apertures engage the projection on the female component substantially simultaneously with engagement of the first and second seal members with the first and second diameter portions of the stepped bore in the female component.

23. The quick connector of claim 12 further comprising:

first and second bushings integrally formed as a unitary part of the male component, the first bushing disposed between the first seal member and the annular flange on the male component, and the second bushing disposed between the end of the male component and the second seal member.

24. A quick connector comprising:

a female component having a stepped through bore extending axially from a first open end of the female component to a second end of the female component;

a male component having a through bore and a radially extending annular flange spaced from an end insertable through the first open end of the female component into the stepped through bore in the female component;

at least a first seal engagable with the male component and the stepped bore in the female component;

a retainer carried on the male component;

means on the female component and on the retainer for releasably interconnecting the male and female component together upon insertion of the male component into the female component, the releasably interconnecting means including at least one radially outwardly extending projection formed on the female component;

means, carried on the retainer, for mounting the retainer on the annular flange of the male component; and the first seal, the stepped through bore, the male component, and the releasably interconnecting means are disposed in a dimensional relationship such that the releasably interconnecting means interconnects the male and female components substantially simultaneously with engagement of the first seal with both of stepped through bore and the male component.

25. The quick connector of claim 24 wherein the projection comprises:

a plurality of circumferentially spaced, radially outwardly extending projections formed on the female component.

26. The quick connector of claim 25 wherein the retainer comprises:

a base having an aperture for receiving the male component therethrough, and a plurality of circumferentially spaced legs extending from the base adapted to overlie an exterior surface of the female component when the retainer is mounted on the male component and the one end of the male component is inserted into the female component;

an aperture formed in each leg releasably engagable with one of the projections on the female component; and the plurality of legs being provided in a like number as the plurality of projections and disposed at equal circumferential spacings as the plurality of projections.

27. The quick connector of claim 24 wherein the projection comprises:

an annular projection extending circumferentially about and radially extending outward from the female component.

28. A quick connector comprising:

a female component having a stepped through bore extending axially from a first open end of the female component to a second end of the female component, first and second diameter portions formed in the stepped through bore in the female component, the first and second diameter portions having different diameters;

a male component having a through bore and a radially extending annular flange spaced from an end insertable through the first open end of the female component into the stepped through bore in the female component, the male component having a reduced diameter first end portion and an enlarged diameter portion extending from the first end portion;

first and second seal members mounted in the first and second diameter portions, each of the first and second seal members having a corresponding outer diameter sealingly engagable to an inner diameter of the respective first and second diameter portions of the stepped through bore;

a retainer carried on the male component;

means on the female component and on the retainer for releasably interconnecting the male and female components together upon insertion of the male component into the female component means, carried on the retainer, for mounting the retainer on the annular flange of the male component; and the first and second seal members, the stepped through bore, the male component, and the releasably interconnecting means disposed in a dimensional relationship such that the releasably interconnecting means interconnects the male and female components substantially simultaneously with engagement of the reduced diameter first end portion of the male component with the second seal member and substantially simultaneously with engagement of the first seal member with the enlarged diameter portion of the male component during insertion of the male component into the female component.

29. The quick connector of claim 11 further comprising:

a third diameter portion formed adjacent to the first diameter portion in the stepped first bore portion in the female component, the third diameter portion receiving a top hat pre-mounted on the male component during insertion of the end of the male component into the female component.

30. The quick connector of claim 29 wherein:

the top hat is integrally formed as a unitary part of the male component.

31. A quick connector comprising:

a female component having a through bore including a stepped first bore portion opening to a first end of the female component and a second bore portion communicating with the stepped first bore portion and extending to a second end of the female component;

a male component having a through bore and an annular groove spaced from an end insertable through the first open end of the female component into the stepped first bore portion in the female component;

projection means carried on one of the female component and the male component;

means, carried on the other of the female component and the male component, for releasably engaging the projection means when the male component is fully inserted into the stepped first bore portion in the female component;

retainer means, carrying one of the projection means and the means for releasably engaging the projection means, for releasably interconnecting the male and female components together; and means, separate from the retainer means and mountable in the annular groove on the male component and co-operating with the male component, for axially fixedly mounting the retainer means on the male component.

32. A method for connecting male and female components of a quick connector together comprising the steps of:

forming a female component of a housing having a through bore extending from a first open end to an opposed second open end;

forming a male component with a radially extending annular flange spaced from a first end;

forming a retainer with a base having a central aperture for receiving the male component therethrough and at least one leg extending from the base;

forming releasible interconnecting means on the housing of the female component and the leg of the retainer for releasibly interconnecting the female and male components;

mounting the retainer about the annular flange on the male component prior to insertion of the end of the male component into the female component, with the leg of the retainer extending axially from the base; and mounting at least a first seal member for sealing engagement with the through bore of the housing in the female component and the male component;

dimensionally positioning the at least a first seal, the male component, and the releasibly interconnecting means such that upon insertion of the male component into the through bore in the female component the releasible interconnecting means interconnects the female and male components substantially simultaneously with engagement of the first seal with the female and male components.

33. A method for connecting male and female components of a quick connector together comprising the steps of:

forming a female component of a housing having a through bore extending from a first open end to an opposed second open end;

forming a male component with a radially extending annular flange spaced from a first end;

forming a retainer with a base having a central aperture for receiving the male component therethrough and at least one leg extending from the base;

forming a plurality of circumferentially spaced legs on the retainer, each leg having an aperture therein;

forming a projection on the housing of the female component engagable with each aperture in each leg of the retainer when the male component is inserted into the female component;

mounting the retainer about the annular flange on the male component prior to insertion of the end of the male component into the female component, with the leg of the retainer extending axially from the base; and mounting at least a first seal member for sealing engagement with the through bore of the housing in the female component and the male component;

dimensionally positioning the at least a first seal, the male component, and the releasibly interconnecting means such that upon insertion of the male component into the through bore in the female component the releasible interconnecting means interconnects the female and the male components substantially simultaneously with engagement of the first seal with the female and male components.

34. The method of claim 33 further comprising the step of:

forming a plurality of circumferentially spaced projections on the housing, each projection engagable with one aperture in one leg of the retainer.

35. A method for connecting male and female components of a quick connector together comprising the steps of:

forming a female component of a housing having a through bore extending from a first open end to an opposed second open end;

forming the bore in the housing as a stepped bore having a first diameter portion and a second diameter portion smaller in diameter than the first diameter portion and axially spaced from the first diameter portion;

forming a male component with a radially extending annular flange spaced from a first end;

forming a retainer with a base having a central aperture for receiving the male component therethrough and at least one leg extending from the base;

forming releasible interconnecting means on the housing of the female component and the leg of the retainer for releasibly interconnecting the female and male components;

mounting the retainer about the annular flange on the male component prior to insertion of the end of the male component into the female component, with the leg of the retainer extending axially from the base;

spacedly mounting a first seal member and a second seal member on the male component prior to insertion of the end of the male component into the female component;

forming the first and second seal members with substantially identical inner diameters;

forming a first outer diameter of the first seal member sized to sealingly engage the first diameter portion of the bore in the housing;

forming a second outer diameter of the second seal member sized to sealingly engage the second diameter portion of the bore in the housing;

axially disposing the first and second diameter portions of the stepped bore in the housing, the axial spacing of the first and second seal members on the male component, and the releasibly interconnecting means such that the first and second seal members sealingly engage the first and second diameter portions of the bore substantially simultaneously upon insertion of the end of the male component into the female component and substantially simultaneously with the interconnection of the female and the male components by the releasible interconnecting means.

36. The method of claim 32 further comprising the steps of:

forming an axial slot in the base of the retainer; and urging the base over the male component such that opposed edges of the base forming the slot deflect outward from each other to open the base about the slot to enable the base of the retainer to be snapped over the male component.

37. A method for connecting male and female components of a quick connector together comprising the steps of:

forming a female component of a housing having a through bore extending from a first open end to an opposed second open end;

forming a male component with a radially extending annular flange spaced from a first end;

forming the male component with a reduced diameter first end and an enlarged diameter portion extending from the first end;

forming the through bore in the housing as a stepped bore having a first diameter portion;

forming a second diameter portion in the stepped bore in the housing smaller in diameter than the first diameter portion and axially spaced from the first diameter portion;

forming a retainer with a base having a central aperture for receiving the male component therethrough and at least one leg extending from the base;

forming releasible interconnecting means on the housing of the female component and the leg of the retainer for releasibly interconnecting the female and male components;

mounting the retainer about the annular flanqe on the male component prior to insertion of the end of the male component into the female component, with the leg of the retainer extending axially from the base;

mounting a first seal member and a second seal member in the first and second diameter portions in the housing, respectively;

forming the first and second seal members with different inner diameters such that the first seal member sealingly engages the enlarged diameter portion of the male component substantially simultaneously with sealing engagement of the second seal member with the reduced diameter first end portion of the male component and further substantially simultaneously with engagement of the female and male components by the releasibly interconnecting means upon insertion of the end of the male component into the female component.

38. The method of claim 35 further comprising the steps of:

mounting first and second bushings on the male component prior to insertion of the male component into the female component;

the first bushing being disposed between the flange on the male component and the first seal member; and the second bushing being disposed between the end of the male component and the second seal member.

39. The method of claim 38 further comprising the steps of:

forming at least one annular recess on the male component;

the first and second seal members disposed in the at least one recess; and the outer diameter of the first seal member extending radially outward farther than the outer diameter of the second seal member.

40. The method of claim 38 further comprising the step of:

integrally forming the first and second bushings as a unitary, single piece part of the male component.

41. A method for connecting male and female components of a quick connector together comprising the steps of:

forming a female component of a housing having a through bore extending from a first open end to an opposed second open end;

forming a male component with an annular groove spaced from a first end;

forming a retainer with a base having a central aperture for receiving the male component therethrough and at least one leg extending from the base;

forming releasibly interconnecting means on the housing of the female component and the leg of the retainer;

mounting the retainer on the male component prior to insertion of the end of the male component into the female component, with the at least one leg of the retainer extending axially from the base in parallel to and spaced from the male component;

mounting a lock member in the annular groove in the male component to mount the retainer on the male component; and inserting one end of the male component through the first open end of the housing of the female component into the bore in the housing until the engage to lock the male and female components together.

* * * * *